(12) United States Patent
Park et al.

(10) Patent No.: US 6,935,915 B2
(45) Date of Patent: Aug. 30, 2005

(54) METHOD OF FABRICATING FIELD EMISSION DISPLAY EMPLOYING CARBON NANOTUBES

(75) Inventors: Shang-hyeun Park, Chungcheongnam-do (KR); Deuk-seok Chung, Kyungki-do (KR); Hang-woo Lee, Kyungki-do (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 374 days.

(21) Appl. No.: 10/209,937

(22) Filed: Aug. 2, 2002

(65) Prior Publication Data

US 2003/0027478 A1 Feb. 6, 2003

(30) Foreign Application Priority Data

Aug. 6, 2001 (KR) .................................... 2001-47239

(51) Int. Cl.$^7$ ................................................ H01J 9/02
(52) U.S. Cl. .......................................... 445/24; 313/311
(58) Field of Search ............................. 445/24; 313/311

(56) References Cited

U.S. PATENT DOCUMENTS

| | | | | |
|---|---|---|---|---|
| 5,587,720 A | * | 12/1996 | Fukuta et al. .............. | 313/309 |
| 5,969,467 A | * | 10/1999 | Matsuno ..................... | 313/309 |
| 6,333,598 B1 | * | 12/2001 | Hsu et al. .................... | 313/495 |
| 6,448,701 B1 | * | 9/2002 | Hsu ............................. | 313/309 |
| 2002/0171347 A1 | * | 11/2002 | Hirasawa et al. .......... | 313/311 |
| 2003/0049875 A1 | * | 3/2003 | Sheu et al. .................. | 445/24 |

FOREIGN PATENT DOCUMENTS

| | | |
|---|---|---|
| EP | 1 073 090 A2 | 1/2001 |
| EP | 1 102 299 A1 | 5/2001 |
| EP | 1 134 304 A2 | 9/2001 |
| EP | 1 146 541 A2 | 10/2001 |

* cited by examiner

Primary Examiner—Kenneth J. Ramsey
(74) Attorney, Agent, or Firm—Burns, Doane, Swecker & Mathis, LLP

(57) ABSTRACT

A method of fabricating a field emission display employing carbon nanotubes (CNTs) as electron emitters is provided. The method includes forming a cathode on a substrate; forming a gate insulation layer having a plurality of gate holes on the cathode; forming a gate electrode having a plurality of via-holes corresponding to the gate holes, respectively, on the gate insulation layer; forming a plurality of conductive columns higher than the gate electrode on the cathode within the respective gate holes; adhering the CNTs to the bottom of a plate template which is separately provided; bringing the bottom of the template having the CNTs to contact the tops of the conductive columns to adhere the CNTs to the tops of the conductive columns; and firing the conductive columns to lower the levels thereof. Accordingly, the problems of conventional methods, such as sinking of CNTs caused by screen printing, residual CNTs remaining within a gate when a lift-off method is used and short circuiting between gate and cathode due to the residual CNTs, can be solved. In addition, CNTs are applied to only a part for field emission, that is, only the top of a conductive column, thereby requiring fewer CNTs and decreasing fabrication cost. Moreover, the method uses stamping in order to form CNTs, so it is very advantageous in mass production.

6 Claims, 7 Drawing Sheets

(4 of 7 Drawing Sheet(s) Filed in Color)

METHOD OF FABRICATING FIELD EMISSION DISPLAY EMPLOYING CARBON NANOTUBES

Priority is claimed to Patent Application Number 2001-47239 filed in Republic of Korea on Aug. 6, 2001, herein incorporated by reference.

BACKGROUND OF THE INVENTION

1. Field of the Invention

The present invention relates to a field emission display (FED) employing carbon nanotubes (CNTs) and a method of manufacturing the FED, and more particularly, to an FED employing CNTs which realizes low power consumption, high brightness, and high definition, and which is suitable for mass production, and a method of fabricating the FED.

2. Description of the Related Art

Recently, display apparatuses used in personal computers (PCs) and television sets are being widely used in new application fields as well. Such display apparatuses includes cathode ray tubes using high-speed thermal electron emission and flat display devices such as liquid crystal displays (LCDs), plasma display panels (PDPs), and FEDs which have been rapidly developed recently.

FEDs (hereinafter, referred to as CNT FEDs) employing CNTs instead of micro tips as electron emitters are far more advantageous than cathode ray tubes in terms of view angle, definition, power consumption, and temperature stability. There is a possibility that CNT FEDs will be applied to various fields such as car navigation apparatuses and view finders in electronic video apparatuses. Particularly, there is possibility that CNT FEDs will be used as alternative displays in PCs, personal data assistants (PDAs), medical instruments, high-definition televisions (HDTVs), etc.

Generally, CNTs positioned under a gate electrode in a CNT FED are formed by a thick film process using, for example, screen printing, a lift-off process which is an application of photolithography, and a back-side exposure process.

A thick film process requires much time, expensive CNT powder, and CNT paste which is a vehicle employing the CNT powder. FIG. 1 is a scanning electron microscope (SEM) photograph of CNT paste printed on a substrate and shows the form in which CNTs exist within the paste. Such CNT paste is very expensive, thereby increasing fabrication cost. Moreover, problems such as the sinking of CNTs, which is caused by physical force applied during a thick film process and prevents emission, and short circuiting between a gate and a cathode due to residual CNT paste remaining within the gate after a lift-off process may occur.

SUMMARY OF THE INVENTION

To solve the above-described problems, it is an object of the present invention to provide a method of fabricating a field emission display (FED) employing carbon nanotubes (CNTs) which realizes low manufacturing cost and high yield.

To achieve the above object of the present invention, there is provided a method of fabricating a field emission display employing CNTs. The method includes forming a cathode on a substrate; forming a gate insulation layer having a plurality of gate holes on the cathode; forming a gate electrode having a plurality of via-holes corresponding to the gate holes, respectively, on the gate insulation layer; forming a plurality of conductive columns higher than the gate electrode on the cathode within the respective gate holes; adhering the CNTs to the bottom of a plate template which is separately provided; bringing the bottom of the template having the CNTs to contact the tops of the conductive columns to adhere the CNTs to the tops of the conductive columns; and firing the conductive columns to lower the levels thereof.

The CNTs may be formed on the bottom of the template by a growth method or may be adhered to the bottom of the template in a state of purified powder which is separately produced. Coating the tops of the conductive columns with an adhesive before the CNTs are adhered thereto promotes stable adhesion of the CNTs.

BRIEF DESCRIPTION OF THE DRAWINGS

The patent or application file contains at least one color drawing executed in color. Copies of this patent or patent application publication with color drawings will be provided by the Office upon request and payment of the necessary fee.

The above object and advantages of the present invention will become more apparent by describing in detail a preferred embodiment thereof with reference to the attached drawings in which.

DETAILED DESCRIPTION OF THE INVENTION

Figure 1:
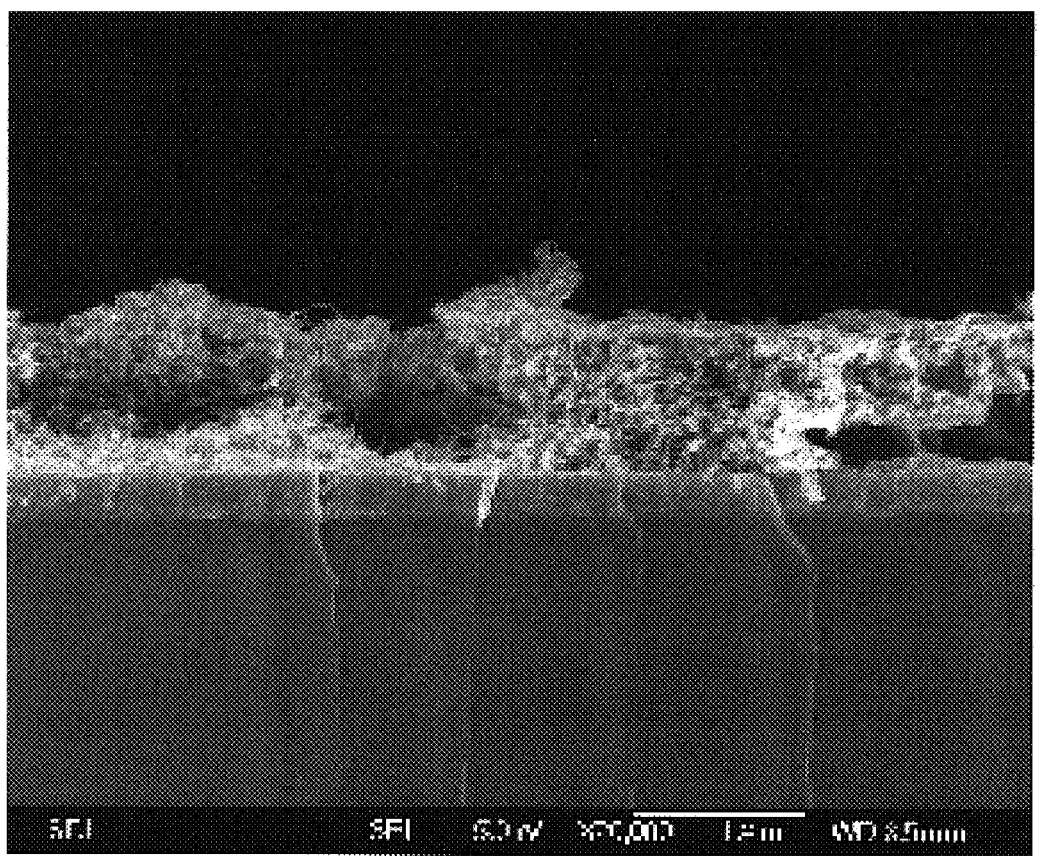
FIG. 1 is a scanning electron microscope (SEM) photograph of carbon nanotube (CNT) paste printed on a substrate.
Figure 2A:
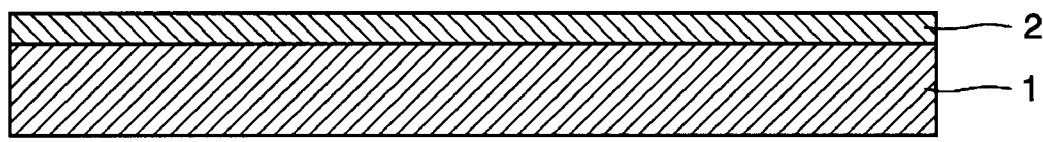
FIGS. 2A through 3D are sectional views of stages in a process of fabricating a field emission display (FED) employing CNTs according to an embodiment of the present invention.
Figure 2B:
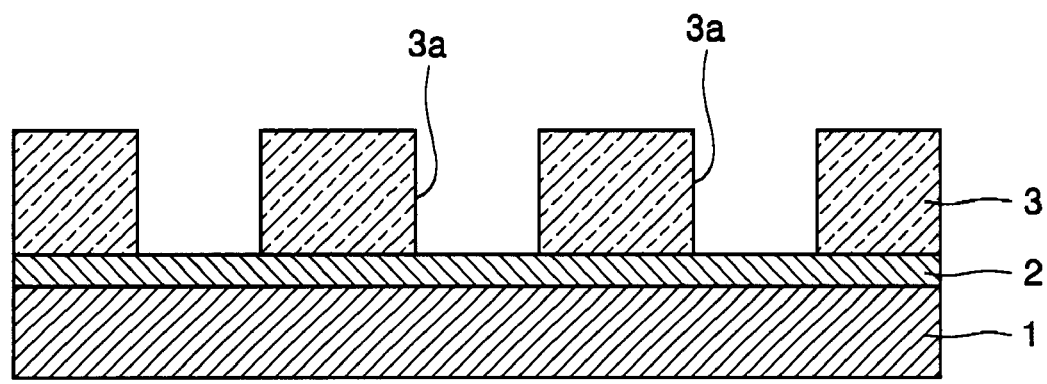
Figure 2C:
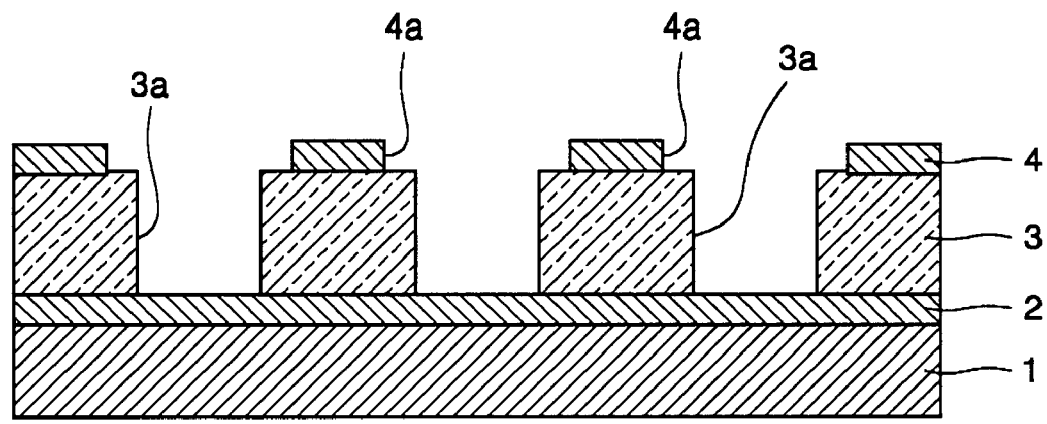

Processes shown in FIGS. 2A through 2C belongs to a conventional method of fabricating an FED, and thus will not be described in detail. Also, they can be replaced with corresponding processes belonging to other conventional methods.

As shown in FIG. 2A, an indium tin oxide (ITO) cathode 2 is formed in a predetermined pattern on a substrate 1 formed of, for example, soda lime glass.

As shown in FIG. 2B, a gate insulation layer 3 is formed on the substrate 1. The gate insulation layer 3 has gate holes 3A partially exposing the cathode 2. The gate insulation layer 3 may be formed by a screen printing method or other well known methods.

As shown in FIG. 2C, a gate electrode 4 is formed on the gate insulation layer 3. The gate electrode 4 has via-holes 4a corresponding to the gate holes 3a and is formed by depositing and patterning a metal material using a thin film process or thick film process or by screen-printing metal paste.

As mentioned above, the processes of FIGS. 2A through 2C are well known and can be varied. It is the following processes that characterize the present invention.

Figure 3A:
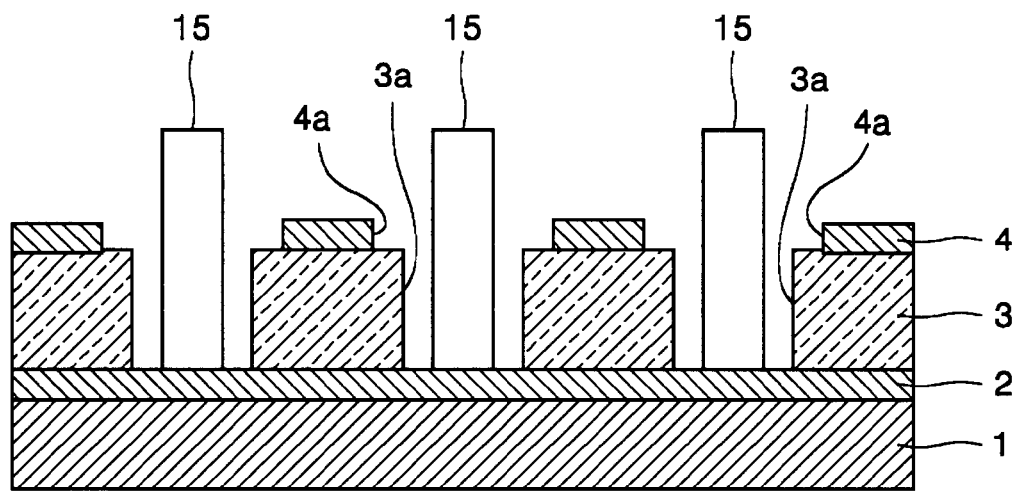

As shown in FIG. 3A, conductive columns 15 shrinking in the case of firing are formed on the cathode 2 exposed at the bottom of the gate holes 3a. Each of the conductive columns 15 is formed at the center of each of the gate holes 3a and is higher than the gate electrode 4. Here, it is preferable that the tops of all of the conductive columns 15 are at the same level.

The conductive columns 15 may be formed by a screen printing method using squeezing of silver paste, a lift-off method using a sacrificial layer, or a photolithography method involving exposing the backside of a substrate to light. The method of forming the conductive columns 15 does not restrict the technological scope of the present invention. Silver paste used in tests was DC 206 made by DuPont.

Figure 3B:
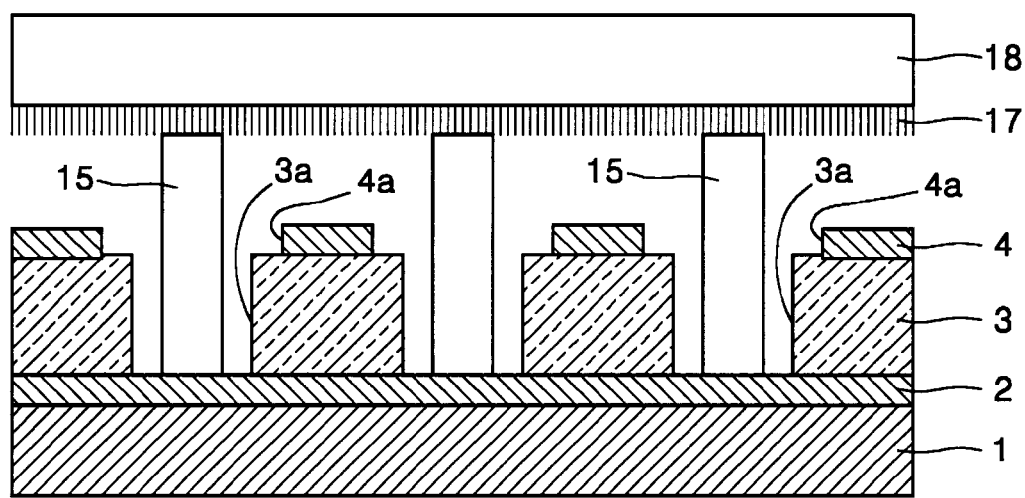

As shown in FIG. 3B, a template 18 with highly purified CNTs 17 adhered to its bottom is brought close to the tops of the conductive columns 15. Here, the CNTs 17 contact the tops of all of the conductive columns 15. Herein, this process is referred to as stamping.

The CNTs 17 may be adhered to the bottom of the template 18 in a state of purified CNT powder by an appropriate adhesive material or may be directly grown on the template 18. In addition, if the tops of the conductive columns 15 are coated with an appropriate adhesive material, the CNTs 17 can be more effectively installed on (adhered to) the conductive columns 15.

The size of the template 18 is related to the number of conductive columns 15 on which the CNTs 17 can be installed in an FED. In other words, in some cases CNT installation on every conductive column 15 can be completed by stamping just one time. In the case of a larger FED, it may be necessary to perform stamping more than once to complete CNT installation on every conductive column 15 throughout the FED.

In FIG. 3B, it looks as if the CNTs 17 vertically stand on the bottom of the template 18, but actually, they adhere thereto in disorder like fiber.

Figure 3C:
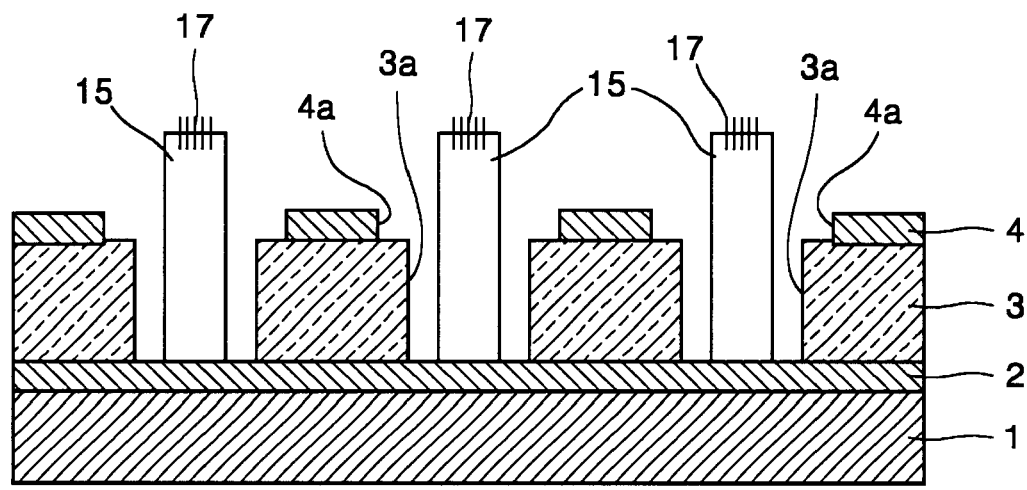
Figure 3D:
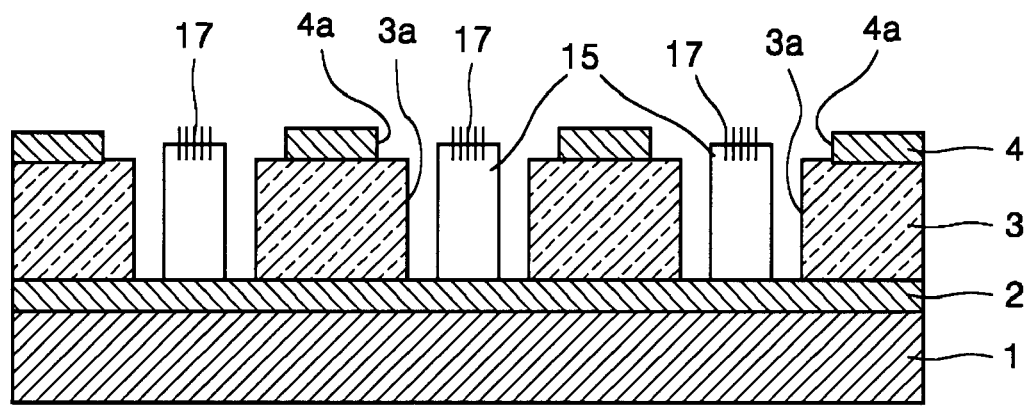

When stamping is completed through the above-described process, the CNTs 17 are installed on (actually, adhered to) the tops of the conductive columns 15, as shown in FIG. 3C. In this state, if firing is performed on the conductive columns 15 at 450 through 550° C., the conductive columns 15 shrink and become lower than the gate electrode 4, as shown in FIG. 3D.

Through the above-described processes, some of the processes performed on a lower substrate on which electron emitters are provided in an FED are completed.

Figure 4A:
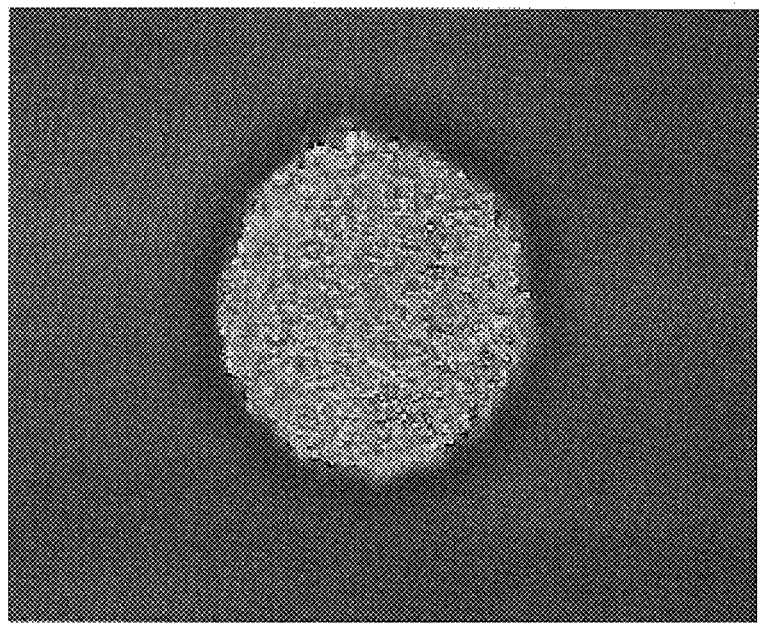
FIG. 4A is an SEM photograph of the plane of a conductive column before it is stamped with CNTs according to a method of fabricating an FED of the present invention.
Figure 4B:
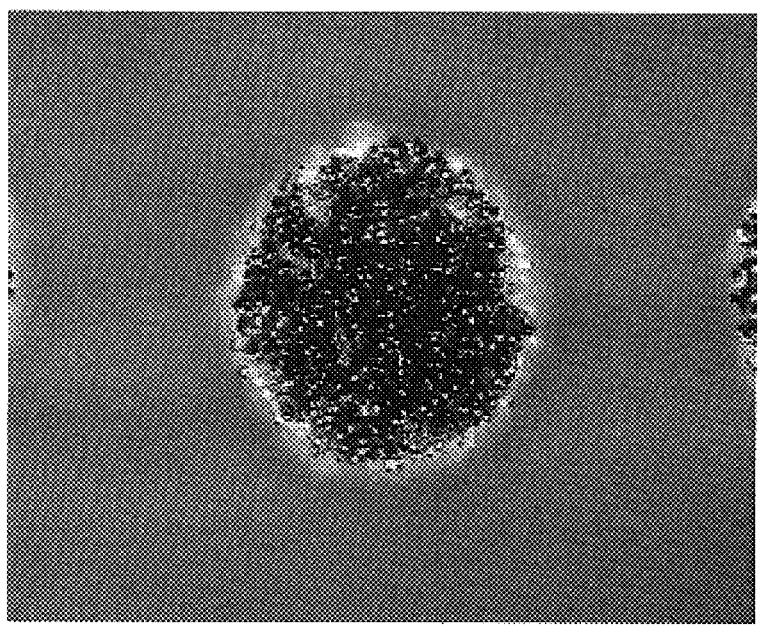
FIG. 4B is an SEM photograph of the plane of a conductive column after it is stamped with CNTs according to a method of fabricating an FED of the present invention.

FIG. 4A is an SEM photograph of the plane of one of the conductive columns 15 before the CNTs 17 are stamped. FIG. 4B is an SEM photograph of the plane of the conductive column 15 after the CNTs 17 are stamped. Here, highly purified CNT powder produced by Caborex is used for the CNTs 17.

Figure 5:
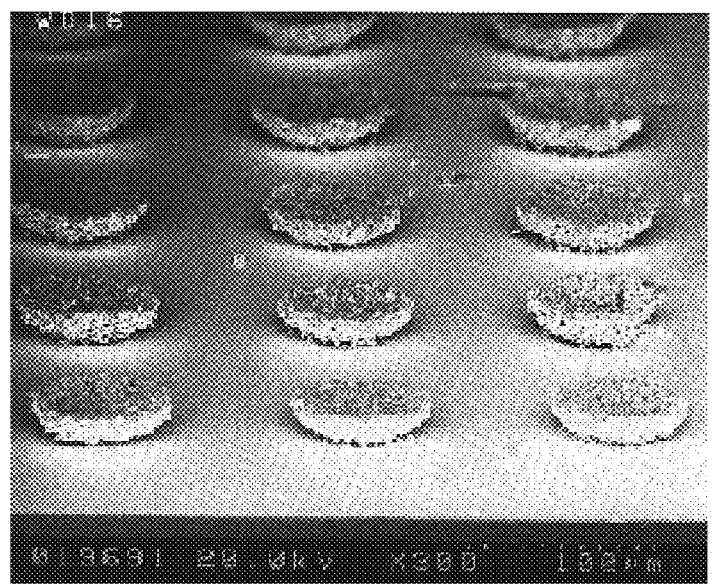
FIG. 5 is an SEM photograph of a plurality of conductive columns formed on a substrate according to a method of fabricating an FED of the present invention.
Figure 6:
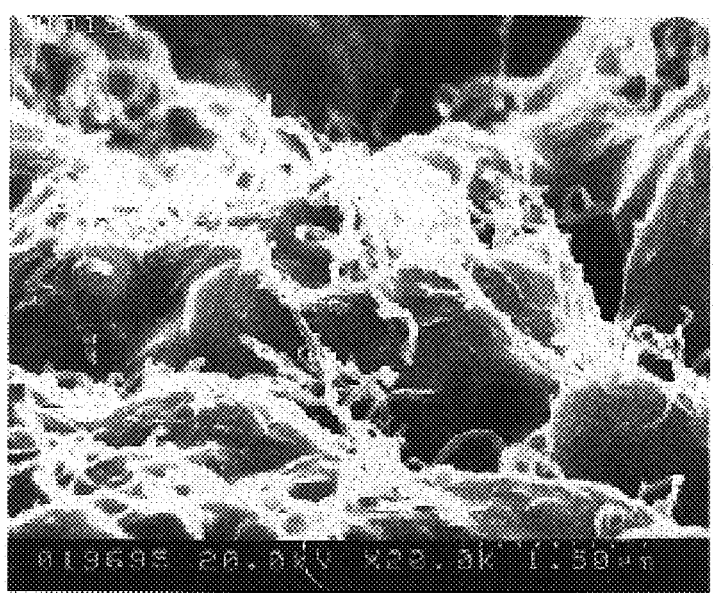
FIG. 6 is an SEM photograph of an enlarged conductive column to which CNTs adhere according to a method of fabricating an FED of the present invention.
Figure 7:
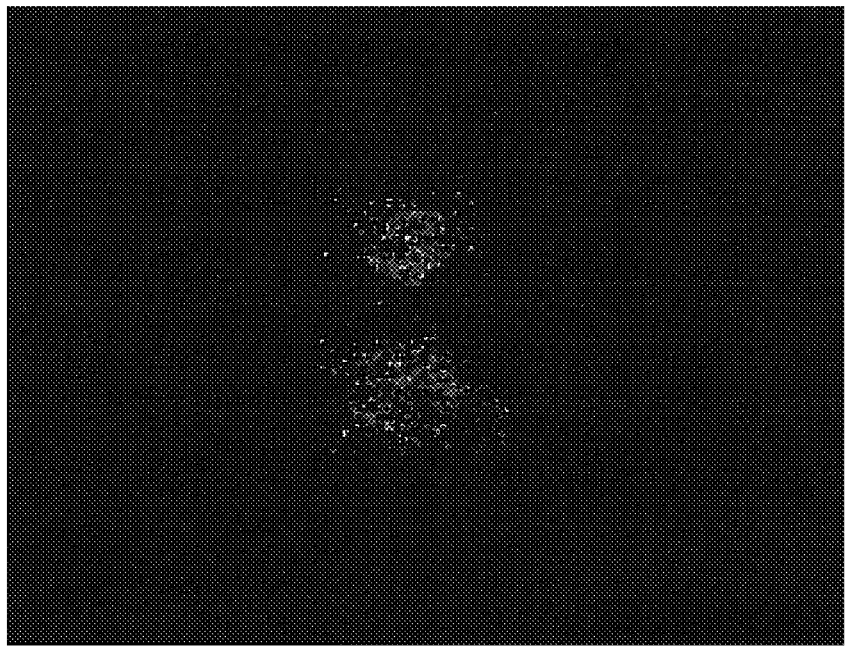
FIG. 7 is a photograph of field emission of an FED fabricated according to the present invention.

FIG. 5 is an SEM photograph of a plurality of conductive columns formed on a substrate. FIG. 6 is an SEM photograph of an enlarged conductive column to which CNTs adhere. In FIG. 5, a gate electrode and a cathode electrode are omitted, and only the conductive columns are formed on the substrate. When the field emission characteristic of an FED fabricated using the CNTs shown in FIG. 6 was measured, it was proven that stable electron emission was achieved, as shown in FIG. 7.

As described above, a method of fabricating a CNT FED according to the present invention can solve the problems of conventional methods such as sinking of CNTs caused by screen printing, residual CNTs remaining within a gate when a lift-off method is used, and short circuiting between gate and cathode due to the residual CNTs. In addition, unlike conventional methods, CNTs are applied to only a part for field emission, that is, only the top of a conductive column, in the present invention, thereby requiring fewer CNTs and decreasing fabrication cost. Since the present invention uses stamping to form CNTs, it is very advantageous in mass production.

What is claimed is:

1. A method of fabricating a field emission display employing carbon nanotubes (CNTs), the method comprising the steps of:

forming a cathode on a substrate;

forming a gate insulation layer having a plurality of gate holes on the cathode;

forming a gate electrode having a plurality of via-holes corresponding to the gate holes, respectively, on the gate insulation layer;

forming a plurality of conductive columns higher than the gate electrode on the cathode within the respective gate holes;

adhering the CNTs to the bottom of a plate template which is separately provided;

bringing the bottom of the template having the CNTs to contact the tops of the conductive columns to adhere the CNTs to the tops of the conductive columns; and firing the conductive columns to lower the levels thereof.

2. The method of claim 1, wherein the CNTs are formed on the bottom of the template by a growth method.

3. The method of claim 2, wherein the tops of the conductive columns are coated with an adhesive before the CNTs are adhered thereto.

4. The method of claim 1, wherein the CNTs are adhered to the bottom of the template in a state of purified powder.

5. The method of claim 4, wherein the tops of the conductive columns are coated with an adhesive before the CNTs are adhered thereto.

6. The method of claim 1, wherein the tops of the conductive columns are coated with an adhesive before the CNTs are adhered thereto.

* * * * *